Aug. 14, 1934.        J. C. McCUNE        1,969,812
QUICK ACTION VALVE
Filed Sept. 6, 1930
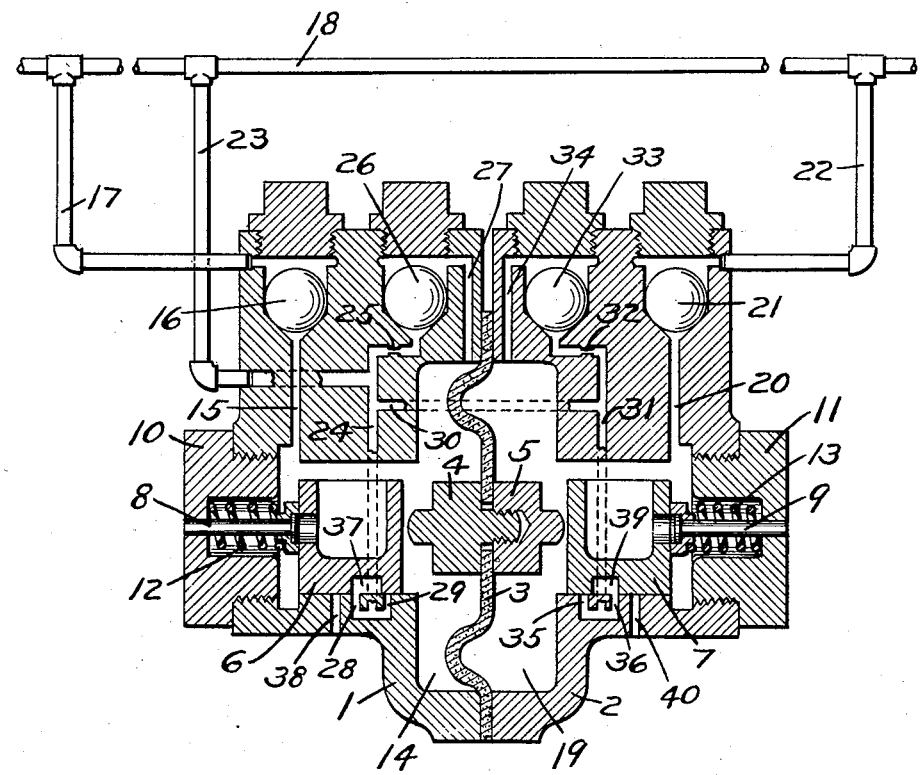
INVENTOR.
JOSEPH C. McCUNE
BY
*Wm. M. Cady*
ATTORNEY.

Patented Aug. 14, 1934

1,969,812

UNITED STATES PATENT OFFICE 1,969,812

QUICK ACTION VALVE

Joseph C. McCune, Edgewood, Pa., assignor to The Westinghouse Air Brake Company, Wilmerding, Pa., a corporation of Pennsylvania Application September 6, 1930, Serial No. 480,124

19 Claims. (Cl. 303—82)

This invention relates to fluid pressure brakes, and more particularly to means for effecting quick serial action through the brake pipe of an automatic fluid pressure brake system.

It has been found that the quick action means at present employed does not act with the desired rapidity on long trains, so that in effecting an emergency application of the brakes, the brakes are liable to be applied on cars at the head end of the train sufficiently in advance of the application of the brakes on cars at the rear end of the train, so that dangerous shocks are produced by the consequent running in of the slack.

The principal object of my invention is to provide an improved quick action means, by which the time of quick action transmission is reduced to a minimum.

In order to effect a quicker serial action, I propose to employ a very sensitive quick action means, which is quickly responsive to a light differential of pressures to effect a local reduction in brake pipe pressure, and in order to prevent this sensitive quick action device from operating when not intended, under gradual or service rates of reduction in brake pipe pressure and other fluctuations in brake pipe pressure not at an emergency rate of reduction, I employ a new principle of operation, in which I utilize the gradient in pressure set up between two points in the brake pipe such as at points at opposite ends of the car, to produce a differential of pressures on a diaphragm or movable abutment.

It is necessary that there be a heavy volume flow of fluid at a high velocity in the brake pipe, which is only produced when the brake pipe is reduced at an emergency rate, in order that a sufficient gradient will be set up between two points in the brake pipe, so that even the slight differential of pressures necessary to operate the quick action diaphragm will be produced.

Thus my improved quick action device, being very sensitive and quickly responsive to light differential pressures, will produce a transmission of quick action in less time than heretofore, while at the same time the device will only operate when an emergency rate of reduction in brake pipe pressure is initiated.

In the accompanying drawing, the single figure is a diagrammatic sectional view of a quick action valve device embodying my invention.

As shown in the drawing, the quick action valve device may comprise a casing formed of sections 1 and 2, between which is clamped a flexible diaphragm 3. Secured centrally to the diaphragm are valve operating members 4 and 5, for operating the respective slide valves 6 and 7.

The valves 6 and 7 may be provided with guide stems 8 and 9 respectively, which extend through bores in screw plugs 10 and 11 and serve to guide the movement of the valves. Springs 12 and 13 act on the respective valves 6 and 7 and tend to maintain the valves in the normal positions as shown in the drawing.

The chamber 14 at one side of the diaphragm 3 is connected to a passage 15, which leads past a ball check valve 16, to a pipe 17, which in turn is connected to the brake pipe 18 preferably near one end of the car. The chamber 19 at the opposite side of the diaphragm 3 is connected to a passage 20 which leads past a ball check valve 21 to a pipe 22, which in turn is connected to the brake pipe 18 at a point near the opposite end of the car.

A pipe 23 is connected to the brake pipe preferably near the middle of the car and said pipe is connected to a passage 24 having a choke passage 25 and leading, past a ball check valve 26 to a passage 27 which opens into chamber 14. The passage 24 also leads to the seat of slide valve 6 by way of two branch passages 28 and 29.

The passage 24 is also connected to a passage 30 which leads to a passage 31 having a choke passage 32, and leading past a check valve 33 to a passage 34 opening into chamber 19. The passage 31 has two branch passages 35 and 36 leading to the seat of slide valve 7.

In operation, when the brake pipe 18 is charged with fluid under pressure, fluid flows through the pipe 23, the choke passage 25 and past the check valve 26 to passage 27 and thence to chamber 14, charging said chamber at the pressure carried in the brake pipe. Fluid also flows from passage 24, through passage 30 to passage 31 and thence to the chamber 19 through the choke passage 32 and past the check valve 33 and through passage 34 to said chamber. Consequently, the fluid pressures in chambers 14 and 19 at opposite sides of the diaphragm 3 are maintained equal at the pressure carried in the brake pipe.

Assume that an emergency rate of reduction in brake pipe pressure is intiated at a point to the left, so that the reduction travels from left to right through the brake pipe 18. This causes the pressure to be reduced in chamber 14 by flow through passage 15, past check valve 16, and through pipe 17, to the brake pipe. The pressure in chamber 19 is also reduced by flow past the check valve 21 and through pipe 22 to the brake pipe, but since a gradient is established in the brake pipe between the points at which the pipes 17 and 22 connect with the brake pipe, due to the flow of fluid from the brake pipe in heavy volume at a high velocity, the pressure in chamber 14 will be less than the pressure in chamber 19 according to the gradient established in the brake pipe.

This difference in pressure will be relatively light, but it is sufficient to move the very sensitive diaphragm 3 quickly toward the left, so as to cause the slide valve 6 to be shifted to a position, in which a cavity 37 in the slide valve connects branch passage 28 with an atmospheric exhaust port 38 so that fluid under pressure is vented from the brake pipe by way of passage 24. The branch passage 29 is also opened to chamber 14 by this movement, so that fluid under pressure is vented to the atmosphere from the chamber 14, as well as from the brake pipe.

A local reduction in brake pipe pressure is thus produced in less time than heretofore and succeeding quick action valve devices are operated in a similar manner, so that quick action is propagated throughout the train in a minimum time.

When the emergency rate of reduction in brake pipe pressure is initiated at the right, the reduction travels from right to left, and the operation is similar to that previously described, except that the lesser pressure will obtain in chamber 19, so that the diaphragm 3 is moved toward the right to operate the slide valve 7.

The ball check valves 16 and 21 serve to prevent the diaphragm 3 from being actuated in releasing the brakes, when the brake pipe pressure is rapidly increased in using the release position of the engineer's brake valve.

The ball check valves 26 and 33 serve to prevent the pressure on either or both sides of the diaphragm from dropping, due to a lower brake pipe pressure at the middle of the car than at one or the other end of the car, and the choke passages 25 and 32 ensure the uniform charging of the chambers 14 and 19.

While one illustrative embodiment of the invention has been described in detail, it is not my intention to limit its scope to that embodiment or otherwise than by the terms of the appended claims.

Having now described my invention, what I claim as new and desire to secure by Letters Patent, is:

1. In a fluid pressure brake, the combination with a brake pipe, of a quick action valve device subject to opposing fluid pressures which continually vary according to variations in fluid pressure in the brake pipe at two separated points for venting fluid from the brake pipe upon creation of a differential between said opposing pressures.

2. In a fluid pressure brake, the combination with a brake pipe, of a quick action valve device subject on one side to fluid pressure which varies at all times as the fluid pressure varies at one point in the brake pipe and subject on the opposite side to fluid pressure which varies at all times as the fluid pressure varies at another point in the brake pipe and operated upon creation of a differential pressure between said opposing pressures to effect a venting of fluid from the brake pipe.

3. In a fluid pressure brake, the combination with a brake pipe, of a quick action valve device having a movable abutment subject on one side to fluid pressure constantly varying with the brake pipe pressure at one point and subject on the opposite side to fluid pressure constantly varying with the brake pipe pressure at another point, and means operated by said abutment upon creation of a differential pressure between said opposing pressures for venting fluid from the brake pipe.

4. The method of operating a differential pressure actuated quick action device of a fluid pressure brake system, which consists in effecting an emergency rate of reduction in brake pipe pressure and in then employing the gradient created in the brake pipe between two points in the brake pipe when an emergency rate of reduction is effected to produce a differential pressure on said device.

5. In a fluid pressure brake, the combination with a brake pipe, of a quick action valve device having a flexible diaphragm subject to the opposing fluid pressures in chambers at opposite sides of the diaphragm, one chamber being connected to the brake pipe through a relatively large opening at one point, and the other chamber to the brake pipe through a relatively large opening at another point, and means operated by said diaphragm upon creation of a differential pressure between said chambers for venting fluid from the brake pipe.

6. In a fluid pressure brake, the combination with a brake pipe, of a quick action valve device having a flexible diaphragm subject to the opposing fluid pressures in chambers at opposite sides of the diaphragm, one chamber being connected to the brake pipe at one point to permit the pressure in said chamber to continually vary as the brake pipe pressure varies at that point, and the other chamber to the brake pipe at another point to permit the pressure in said other chamber to continually vary as the brake pipe pressure varies at said other point, and a valve operated by said diaphragm upon creation of a differential pressure between said chambers for venting fluid from the brake pipe.

7. In a fluid pressure brake, the combination with a brake pipe, of a quick action valve device having a flexible diaphragm subject to the opposing fluid pressures in chambers at opposite sides of the diaphragm, one chamber being connected to the brake pipe at one point, and the other chamber to the brake pipe at another point, and valves operated by said diaphragm by movement in either direction upon creation of a differential pressure between said chambers for venting fluid from the brake pipe.

8. In a fluid pressure brake, the combination with a brake pipe, of a quick action valve device comprising a flexible diaphragm having the chamber at one side connected to the brake pipe at one point and the chamber at the opposite side connected to the brake pipe at another point, valve means operated by said diaphragm for venting fluid from the brake pipe, said chambers being charged with fluid under pressure from the brake pipe through a connection with the brake pipe intermediate said points.

9. In a fluid pressure brake, the combination with a brake pipe, of a quick action valve device comprising a flexible diaphragm, a pipe connecting the chamber at one side of said diaphragm to the brake pipe at one point, a pipe connecting the chamber at the opposite side of said diaphragm to the brake pipe at another point, valve means operated by said diaphragm for venting fluid from the brake pipe, and check valves for preventing flow from the brake pipe through said pipes to said chambers.

10. In a fluid pressure brake, the combination with a brake pipe, of a quick action valve device comprising a flexible diaphragm, a pipe connecting the chamber at one side of said diaphragm to the brake pipe at one point, a pipe connecting the chamber at the opposite side of said diaphragm to the brake pipe at another point, valve means operated by said diaphragm for venting fluid from the brake pipe, a pipe connected to the brake pipe at a point intermediate the other pipe connections, through which fluid under pressure is supplied from the brake pipe to said chambers, and check valves for preventing flow from the brake pipe through the two first mentioned pipes to said chambers.

11. In a fluid pressure brake, the combination with a brake pipe, of a quick action valve device comprising a flexible diaphragm, a pipe connecting the chamber at one side of said diaphragm to the brake pipe at one point, a pipe connecting the chamber at the opposite side of said diaphragm to the brake pipe at another point, valve means operated by said diaphragm for venting fluid from the brake pipe, a pipe connected to the brake pipe at a point intermediate the other pipe connections, through which fluid under pressure is supplied from the brake pipe to said chambers, check valves for preventing flow from said chambers through said pipe to the brake pipe, and check valves for preventing flow from the brake pipe to said chambers through the other pipes.

12. In a fluid pressure brake, the combination with a brake pipe, of a quick action valve device comprising a diaphragm having chambers at its opposite sides and operable upon a light differential of pressures between said chambers, and valve means operable by said diaphragm upon creation of a light differential in pressures between said chambers for venting fluid from the brake pipe, the chambers at opposite sides of the diaphragm being subject to fluid pressures which continually vary as the pressure varies at separated points in the brake pipe.

13. In a fluid pressure brake, the combination with a brake pipe, of a quick action valve device subject on one side to brake pipe pressure existing at one point in the brake pipe, and on the opposite side to brake pipe pressure existing at another point in the brake pipe and operated by a predetermined differential pressure produced by the gradient in pressure created between said points in the brake pipe upon a reduction in brake pipe pressure, for venting fluid from the brake pipe.

14. In a fluid pressure brake, the combination with a brake pipe, of a quick action valve device comprising a movable abutment subject on one side to brake pipe pressure existing at one point in the brake pipe, and subject on the opposite side to brake pipe pressure existing at another point in the brake pipe, and valve means operated by said abutment upon creation of a predetermined differential pressure on opposite sides of said abutment as produced by the gradient in pressure in the brake pipe between said points in the brake pipe upon a reduction in brake pipe pressure, for venting fluid from the brake pipe.

15. In a fluid pressure brake, the combination with a brake pipe, of a quick action valve device comprising a movable abutment having one side in free open communication with the brake pipe at one point in the brake pipe and having the opposite side in free open communication with the brake pipe at another point in the brake pipe, and valve means operated by said abutment upon creation of a predetermined differential pressure on opposite sides of said abutment, as produced by the gradient in pressure in the brake pipe between said points in the brake pipe, upon a reduction in brake pipe pressure.

16. In a fluid pressure brake, the combination with a brake pipe, of a quick action valve mechanism comprising valve means operative to vent fluid from the brake pipe and a movable abutment for operating said valve means having a chamber at one side communicating with the brake pipe at one point in the brake pipe through a communication which permits the substantially free flow of fluid from said chamber to the brake pipe and having a chamber at the opposite side which communicates with the brake pipe at another point in the brake pipe through a communication which permits the substantially free flow of fluid from said last mentioned chamber to the brake pipe.

17. In a fluid pressure brake, the combination with a brake pipe, of a quick action valve mechanism comprising valve means operative to vent fluid from the brake pipe and a movable abutment for operating said valve means having a chamber at one side communicating with the brake pipe at one point in the brake pipe through a communication which permits the substantially free flow of fluid from said chamber to the brake pipe and having a chamber at the opposite side which communicates with the brake pipe at another point in the brake pipe through a communication which permits the substantially free flow of fluid from said last mentioned chamber to the brake pipe, whereby the movable abutment is operated to effect the operation of said valve means by the gradient in pressure set up in the brake pipe between said two points in the brake pipe, when a reduction in brake pipe pressure is initiated in the brake pipe.

18. In a fluid pressure brake, the combination with a brake pipe, of a quick action valve device comprising two valves, either of which is operable to vent fluid under pressure from the brake pipe, and a movable abutment subject to opposing fluid pressures varying according to variations in fluid pressure in the brake pipe at two separated points for operating one or the other of said valves to vent fluid from the brake pipe upon creation of a differential pressure between said opposing pressures.

19. In a fluid pressure brake, the combination with a brake pipe, of a quick action valve device comprising two valves, either of which is operable to vent fluid under pressure from the brake pipe, and a movable abutment subject to opposing fluid pressures in chambers at opposite sides of the diaphragm, one of said chambers being connected to the brake pipe at one point, and the other chamber to the brake pipe at another point, said abutment being operable upon the creation of a pressure differential between said chambers for actuating one or the other of said valves for venting fluid from the brake pipe.

JOSEPH C. McCUNE.